Dec. 14, 1965   W. J. HILL   3,222,970
LINK MOUNTED SAW ASSEMBLY
Filed April 12, 1963   7 Sheets-Sheet 1
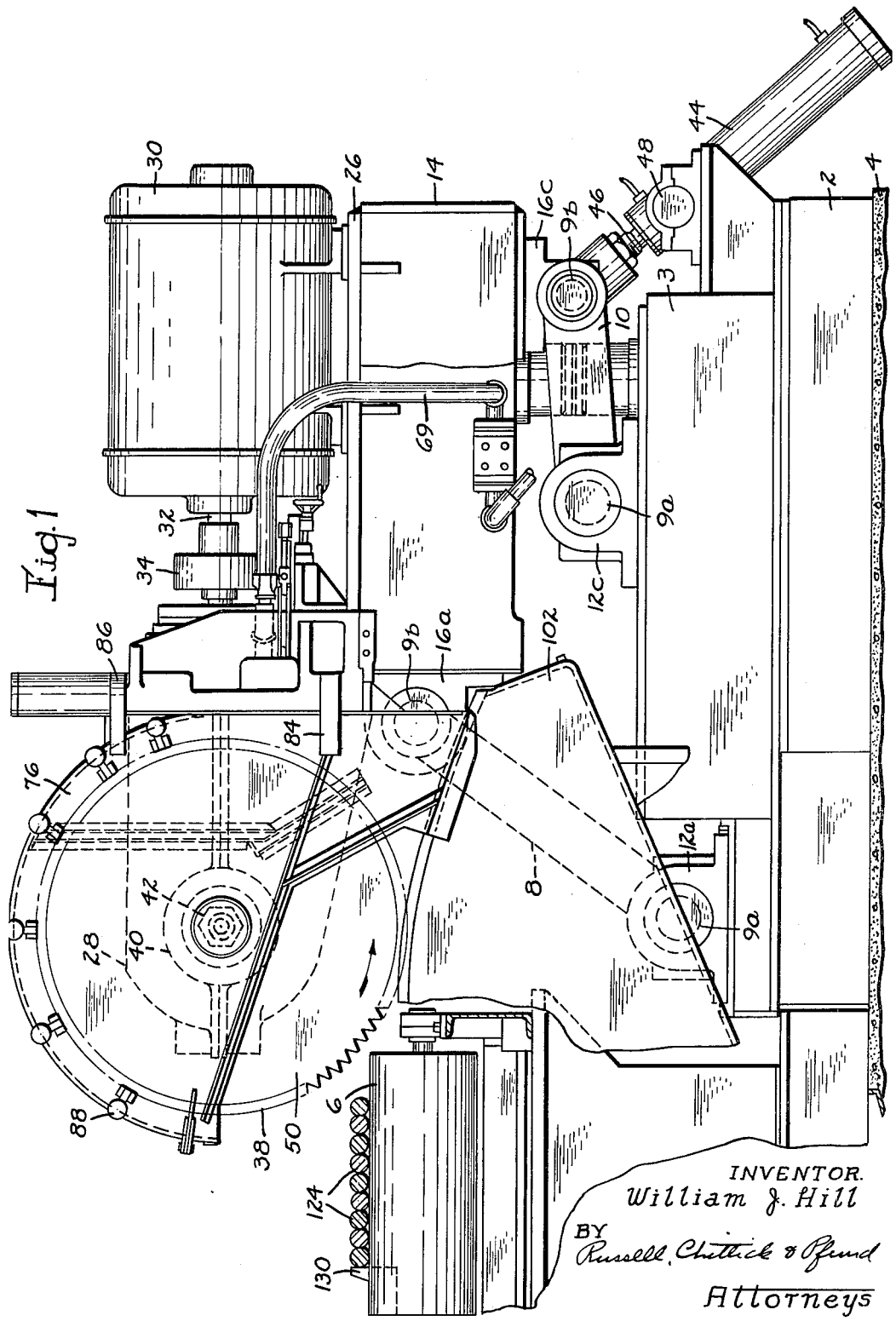
INVENTOR.
William J. Hill
BY
Russell, Chittick & Pfund
Attorneys

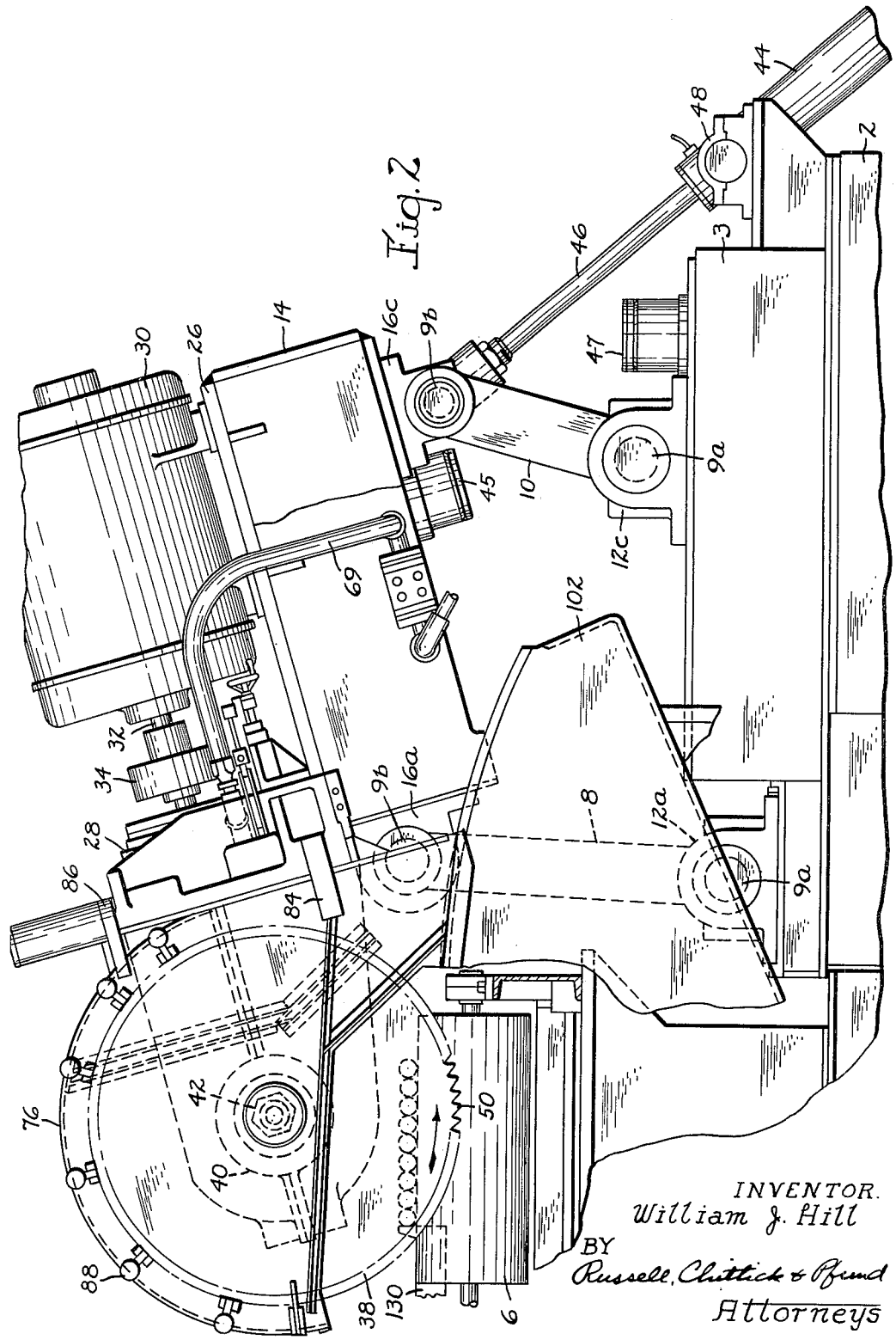

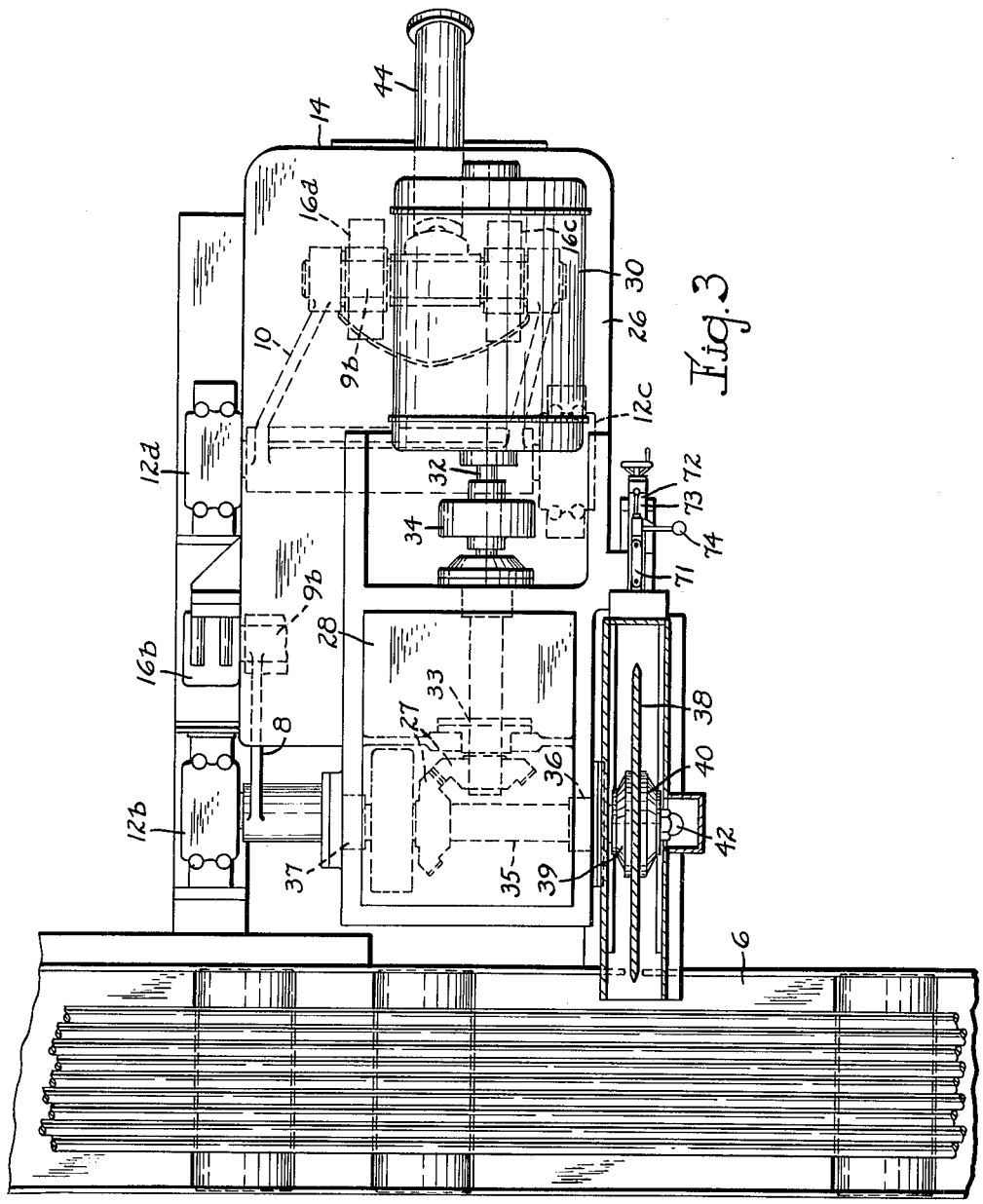

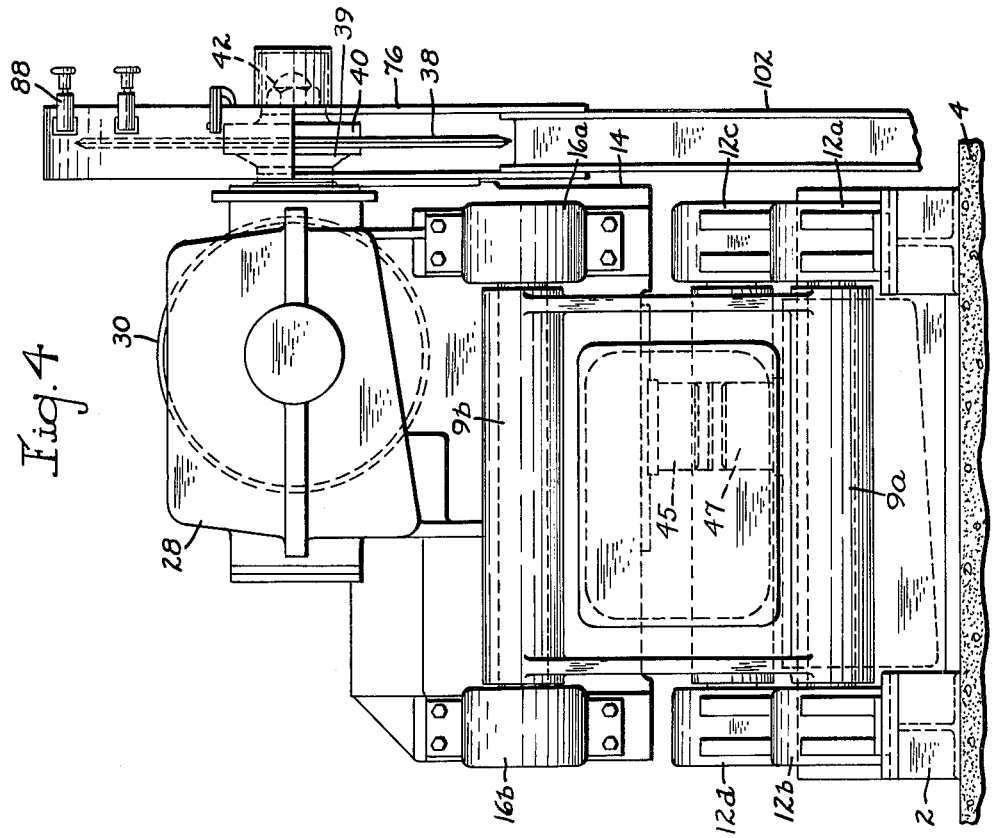
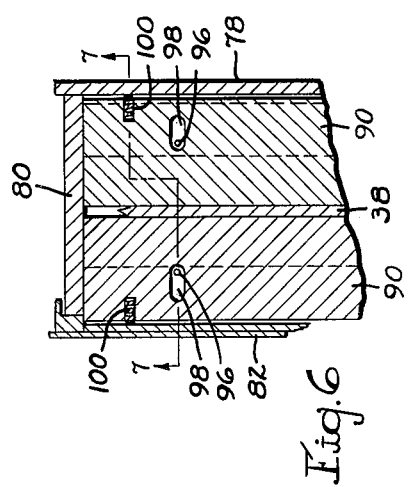
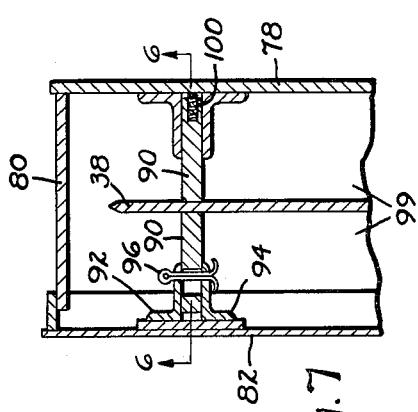

Dec. 14, 1965   W. J. HILL   3,222,970
LINK MOUNTED SAW ASSEMBLY
Filed April 12, 1963   7 Sheets-Sheet 5
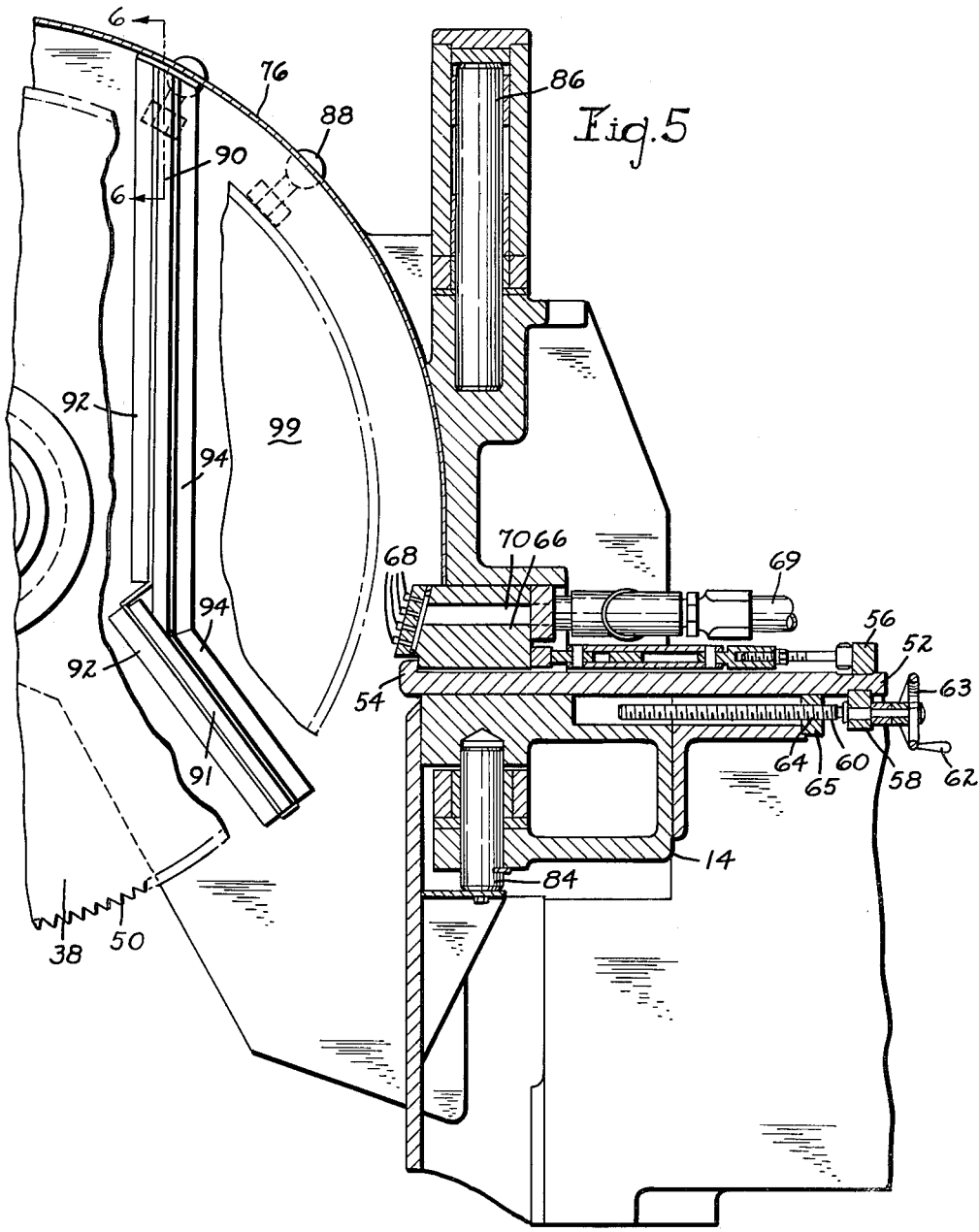
INVENTOR.
William J. Hill
BY
Russell, Chittick & Pfund
Attorneys

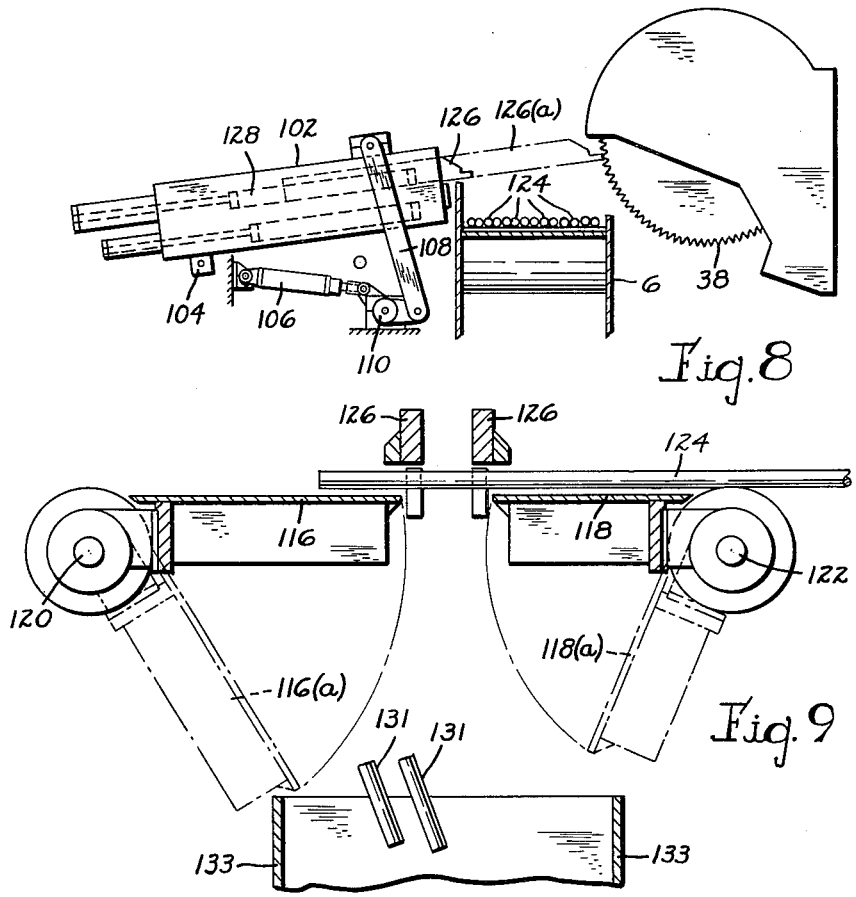

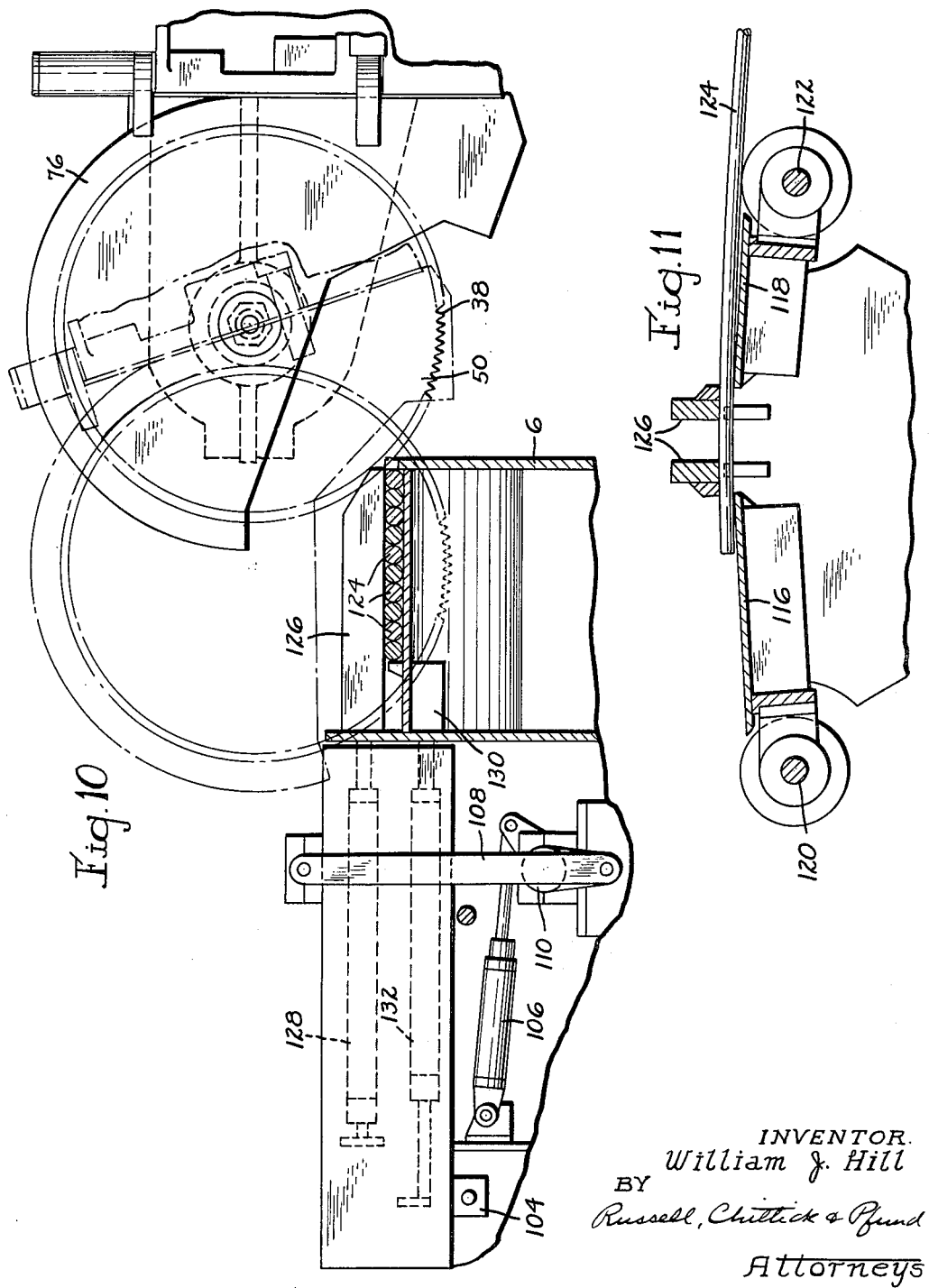

United States Patent Office 3,222,970
Patented Dec. 14, 1965

3,222,970
LINK MOUNTED SAW ASSEMBLY
William J. Hill, Holden, Mass., assignor to Morgan Construction Company, Worcester, Mass., a corporation of Massachusetts
Filed Apr. 12, 1963, Ser. No. 272,616
6 Claims. (Cl. 83—157)

This invention relates to an apparatus for cutting stock in a rolling mill and more particularly to a link mounted saw capable of horizontal displacement in combination with a new and improved crowder and holddown mechanism.

Saws are generally utilized in rolling mills in removing crop ends and in cutting stock into lengths capable of being more efficiently handled in further processing. The cutting operation is usually performed by a toothed circular saw driven at high speeds by an electric motor. The saw blade is normally revolved in a direction which causes the saw teeth to contact the stock in a downward direction in order to allow the cutting pressure of the sawing action to assist in locating and holding the stock during the cutting cycle. In addition, proper sawing technique requires that the cutting edges be cleaned and cooled after each entry into the stock. Consequently, the rotating blade is displaced horizontally into the stationary stock with each tooth being subsequently cooled and cleaned after rotating approximately 120° by being subjected to a high pressure impingement of cooling water before again passing through the stock.

Considerable difficulty has been encountered in the past in developing a satisfactory method of horizontally displacing the rotating saw blade into the stock during the cutting cycle. In hot saw assemblies presently in use, horizontal movement of the rotating saw blade into the stock is usually accomplished by mounting the saw blade and drive motor on a sliding, rolling or swinging frame. The frame is then horizontally propelled by suitable means at right angles to the longitudinal axis of the runoff table into the stock held in a stationary position thereon. Following the completion of the cut, the blade is then withdrawn by sliding, rolling or swinging the frame back to its original position.

This method has proved unsatisfactory for a number of reasons. For example, since operating clearances must be provided between sliding or rolling members, the sliding or rolling frame lacks desired rigidity. Furthermore, as the rotating blade is displaced horizontally into the stock, the sliding or rolling frame is projected beyond its stationary base, creating a cantilever effect. In this extended position, the saw frame receives minimum support from its base. Consequently, the upward forces generated by the saw revolving downwardly into the stock during the cutting cycle have a tendency to lift the frame from the track on which it is rolling or sliding, thereby resulting in pronounced vibrations in both the revolving blade and the supporting frame. This in turn results in a marked increase in blade wear due to uneven tooth loading and an inaccurate cut.

Secondly, the base must be capable of a quick and smooth transverse movement in order to provide a minimum cutting cycle and uniform tooth loading. The accomplishment of this object has been greatly complicated by adverse environmental conditions created by the copious application of high pressure water to the rotating cutting edges in order to cool the blade and loosen chips that may become embedded thereon. The impossibility of containing the water and chips in order to prevent deposits on slides, tracks and wheel bearings has resulted in increased slide, track, bearing and blade wear.

In addition, problems have been encountered in present hot saw assemblies with time-consuming maintenance of the coolant nozzles. Because they often become clogged by loosened chips, frequent removal and cleaning is necessary. This in turn requires careful nozzle readjustments in order to provide a plentiful supply of coolant directly on the cutting edges.

Finally, considerable difficulty has been encountered in properly arranging and holding the stock during the cutting operation. Where irregular shapes are being cut, problems have occurred in crowding the stock toward the saw without having one piece ride over the edges of another. Furthermore, since the cutting blade rotates downwardly toward the stock and thereby exerts a downward force, the stock has exhibited a tendency to pinch the blade and increase wear.

An object of the present invention is to provide a rigid means of supporting the hot saw assembly capable of counteracting the upward force created by the rotating blade entering the stock and of withstanding the vibrations created by the high speed revolutions of the saw blade.

Another object of this invention is to provide a quick and efficient means of pivotally displacing the hot saw assembly through a substantially horizontal cutting path, without the use of wheels, tracks or slides that may become clogged and corroded by chips and cooling water.

A further object of this invention is to provide a means of quickly withdrawing and cleaning the nozzles directing cooling liquid on the revolving cutting edges without the need of subsequent time-consuming readjustments.

These and other objects of the present invention will become more apparent as the description proceeds with the aid of the accompanying drawings in which:

FIG. 1 is a view in side elevation of the pivotally mounted hot-saw assembly with the saw frame in a withdrawn position;

FIG. 2 is a view in side elevation similar to FIG. 1 showing the saw frame in an extended position following the completion of the cutting operation;

FIG. 3 is a plan view of FIG. 1;

FIG. 4 is an end view of FIG. 1 with the runoff table removed;

FIG. 5 is an enlarged sectional view of the cooling assembly showing the cooling block and its quick release toggle strut;

FIG. 6 is a sectional view taken along lines 6—6 of FIG. 5;

FIG. 7 is a sectional view taken along lines 7—7 of FIG. 6;

FIG. 8 is a side view of the crowder and hold-down mechanism in a withdrawn position;

FIG. 9 is an end view of the crowder and hold-down mechanism with the apron plates in a normal horizontal position;

FIG. 10 is an enlarged side view of the crowder and hold-down mechanism in a clamping position;

FIG. 11 is an end view of FIG. 10 showing the apron plates in a clamping position; and FIG. 12 is a plan view of the coolant assembly.

Referring now to FIG. 1, a saw base 2 having a raised portion 3 is shown mounted on the mill floor 4 in fixed relationship to a runoff table 6. Totally enclosed and sealed lower bearing blocks 12a, 12b, 12c and 12d are mounted in spaced oppositely disposed pairs on base 2 and raised portion 3 (see also FIG. 4). Front and rear supporting links 8 and 10 comprised of rectangular casting having horizontal upper and lower pivotal shafts 9a and 9b extending horizontally therethrough are positioned intermediate said oppositely disposed lower bearing blocks with the extremities of lower pivotal shafts 9a rotatably mounted therein.

Totally enclosed and sealed upper bearing blocks 16a, 16b, 16c and 16d are mounted in spaced oppositely disposed pairs on frame 14 in order to receive in pivotal engagement the end extremities of upper pivotal shafts 9b extending through front and rear links 8 and 10. Thus it can be seen that the lower extremities of links 8 and 10 are pivotally mounted on base 2 and raised portion 3 with their upper extremities pivotally mounted to frame 14. All pivotal connections are sealed from cooling water, mill scale and other foreign matter and in this manner, saw frame 14 can be pivotally displaced on supporting links 8 and 10 in a direction transverse to the longitudinal axis of runoff table 6 without the need of troublesome wheels or slides found in conventional saw assemblies.

Saw frame 14 is of a substantially rectangular shape with upper plate 26 attached thereon in order to provide a support for gear housing 28. Drive motor 30 is mounted on the rear portion of frame 14 and is operatively connected though armature shaft 32, clutch assembly 34, input shaft 33 and bevel gear set 27 to saw arbor shaft 35. Saw arbor shaft 35 having inner saw collar 39 attached thereto is journalled between bearings 36 and 37 and lies at a right angle to the input shaft 33. Blade 38 is held in place on shaft 33 against inner saw collar 39 by outer collar 40 and nut 42.

Clutch assembly 34 may include several additional features which although not an essential part of the present invention, will be described in connection with the means of transmitting power to blade 38. A coupling of the type which will allow the motor to come up to speed before picking up the load of the saw blade and bevel gear set may be included in addition to a torque limiting feature which "unloads" the motor armature inertia on bevel gear set 27 in the event of a sudden deceleration of saw blade 38. In addition, clutch assembly 34 may be further provided with a braking mechanism for rapidly stopping the rotation of blade 38 in preparation for a blade-changing operation.

The method of pivotally displacing saw frame 14 with drive motor 30 and saw blade 38 operatively mounted thereon will now be discussed. Hydraulic cylinder 44 containing extensible piston rod 46 is pivotally mounted on base 2 between bearings indicated typically at 48. The upper extremity of piston rod 46 is in turn pivotally connected to the lower rear portion of frame 14 by means of a clevis (not shown). Thus it can be seen that by injecting fluid into hydraulic cylinder 44, piston rod 46 can be extended as shown in FIG. 2, resulting in the forward pivotal displacement of frame 14 in a direction transverse to the longitudinal axis of runoff table 6. It is particularly important to note that, although frame 14 experiences a substantial tipping action during its forward displacement by piston rod 46 (as is illustrated in FIG. 2), the axis of the saw arbor 35 follows a substantially horizontal path. This is due to the geometry of the four bar linkage formed by the fixed saw base, front and rear supporting links 8 and 10, and the saw frame 14. To illustrate, as piston rod 46 is extended, causing frame 14 to be pushed forward, link 8 pivots about its lower bearing blocks 12a and 12b. Consequently, the forward portion of frame 14 is both transversely displaced with respect to the runoff table and raised with respect to the base. However, rear link 10 is simultaneously pivoted about its lower bearing blocks 12c and 12d, causing the rear portion of frame 14 to be vertically displaced through a distance greater than the vertical displacement of the forward portion of frame 14. This in turn results in a pivoting action of frame 14 about the upper bearing blocks 16a and 16b of front link 8, causing a lowering of the outwardly extending blade. Consequently, although the entire frame 14 is tipped and displaced upwardly with respect to base 4, blade 38 is displaced downwardly with respect to the forward portion of frame 14, the net result being that the blade follows a substantially horizontal path during the cutting cycle. Bumper 45 engages bumper 47 as frame 14 is withdrawn and downwardly placed toward base 2, creating a cushioning effect and relieving cylinder 44 of the full weight of frame 14.

In addition, by providing for the pivotal displacement of the saw frame during the cutting cycle, the necessity for providing operating clearances between wheels, tracks or slides as is required in sliding or rolling frames is removed, thereby providing a more rigid and vibration resistant saw assembly. Furthermore, although the saw frame is extended beyond its base (see FIG. 2) during the cutting cycle, links 8 and 10 provide a constant rigid vertical support. Consequently, although the stock exerts an upward opposing force on the rotating blade during the cutting operation, the supporting links exert a constant downward counteracting force which is not diminished by a cantilever action as the frame is extended. In addition to this increased stability in the cutting plane, the lateral stability of the saw is markedly increased due to the fact that each supporting link 8 and 10 is comprised of a rigid casting pivotally mounted between the base 2 and the frame 14 by four bearing blocks.

A further advantage of the pivotal method of supporting and displacing the saw frame is to be found in the eight totally enclosed and sealed bearing blocks 12a, 12b, 12c, 12d, 16a, 16b 16c and 16d. These sealed pivotal connections avoid the possibility of contamination by cooling water and chips, thereby eliminating costly and time-consuming wheel and slide maintenance while providing for a smoother and quicker cutting cycle.

The means of cooling and cleaning the cutting edges of blade 38 will now be described. In order to minimize blade wear and the need for frequent replacement and sharpening, it is necessary to clean and cool the rotating saw teeth 50 after each blade revolution, or stated in the alternative, after each exposure of the teeth to the stock. To accomplish this objective, high pressure impingement of water is applied directly to the rotating teeth with the cooling water being contained briefly within a formed water box partially surrounding the cutting edges. In this manner, any chips that may have remained embedded in the teeth are dislodged and the teeth are sufficiently cooled before again passing through the stock. However, since the diameter of a cutting blade is reduced with each sharpening, provisions for adjustment of the cooling mechanism must be provided in order to insure that the cooling water is properly directed on the cutting edges following the replacement of one blade with another of different diameter. Furthermore, since the nozzles are placed in close proximity to the revolving blade, they are frequently blocked by foreign matter, thereby necessitating frequent nozzle maintenance.

As can be better seen in FIGS. 5 and 12, in order to provide for the desired nozzle adjustment and to facilitate quick nozzle maintenance, frame 14 has been provided with a sliding coolant assembly plate 52 having an integrally fabricated forward stop 54 and a rear stop 56 extending upwardly therefrom. Plate 52 is additionally provided with a depending lug 58 having externally threaded rod 60 journaled for rotation at a right angle thereto. A handle 62 and wheel 63 for rotating rod 60 is attached at one extremity thereto, the other extremity being threaded into internally threaded aperture 64 of upwardly disposed lug 65 attached to frame 14. Consequently, the positional relationship of assembly plate 52 can be varied and adjusted with respect to the outer periphery of blade 38 by simply rotating handle 62. A water block 66 having water nozzles 68 extending outwardly therefrom is slidably mounted on coolant assembly plate 52. High pressure water is carried by piping 69 through interior passageway 70 to nozzles 68. As can be seen in FIG. 5, water block 66 is held against forward stop 54 by a toggle strut 72 comprised of links 71 and 73 and having a handle 74 extending outwardly therefrom. Toggle strut 72 is positioned between and attached to water block 66 and rear stop 56 and thereby exerts equal and opposite axial forces at its extremities when in an extended position as shown in FIG. 1. By simply pulling handle 74 in a direction transverse to the longitudinal axis of the strut 72, the toggle links 71 and 73 may be collapsed and the water block withdrawn from its position against forward stop 54. In this manner, the water nozzles can be quickly cleaned or replaced and the water block re-positioned without readjustment by simply pushing handle 74 back to its original position.

Readjustment of nozzle 68 is accomplished by rotating handle 62 and displacing coolant assembly plate 52 with water block 66 held thereon and is only necessitated by variations in blade diameter.

As can be better seen in FIGS. 5, 6 and 7, blade 38 is partially enclosed within a substantially semi-circular blade housing 76 comprising rear and curved wall members 78 and 80 and a removable side door 82. Door 82 is hinged as at 84 and 86 for ease of opening and is fastened to curved wall member 80 by a plurality of quick-release latches indicated typically at 88.

In order to minimize the amount of cooling water which may be carried onto the stock by the rotating saw blade during the cutting operation and to surround the revolving blade with cooling water, a series of perpendicular and slanted baffles 90 and 91 have been positioned within blade housing 76. The baffles 90 and 91 are contained between tracks 92 and 94 positioned on the inner surfaces of rear wall member 78 and door 82 and are attached thereto by cotter pins 96 inserted through slots 98 in the baffle material. The baffles are held against the side surfaces of the rotating saw blade 38 by springs 100, thereby creating a continuous wiping action and creating a formed water box 99 which partially surrounds the rotating cutting edges. In this manner, the cooling water emitted by nozzles 38 is retained temporarily by the two water boxes 99 formed by baffles 90 and 91 on either side of the saw blades. In addition, the cooling water and chips loosened from the rotating blade 38 are restrained from being deposited on the stock during the cutting operation and are carried downwardly along baffles 90 and 91 to trough 102 (see FIGS. 1 and 2) attached to base member 2.

The operating sequence of the crowder and hold-down mechanism will now be described in relation to the cutting cycle. Before beginning the cutting cycle by advancing the saw blade, the pieces of stock must be laterally aligned by gathering them together and crowding them towards the blade. They must then be firmly held in place on the runoff table during the actual cutting operation. In the past, difficulty has been encountered in crowding stock towards the blade prior to the cutting operation. This is particularly true of irregular shapes such as angles which have a tendency to override one another and bunch-up when a lateral crowding force is applied. The present crowder and hold-down device successfully avoids this overriding tendency by maintaining a constant holding action on the stock during the crowding operation. In addition, the present hold-down mechanism prevents narrowing of the kerf and pinching of the blade by the stock during the cutting operation by creating a slight bending moment in the stock during the cutting operation.

As can be seen in FIG. 8, the crowder and hold-down elevator 102 is positioned to one side of runoff table 6 and is oppositely disposed to saw blade 38. Elevator 102 is pivotally mounted as at 104 and is raised or lowered by the operation of hydraulic cylinder 106 which in turn is operatively connected to arm 108 through linkage 110. When the piston of cylinder 106 is withdrawn as shown in FIG. 8, elevator 102 is pivoted upwardly about pivot point 104 to its raised position.

FIG. 9 is a partial sectional view of the runoff table illustrating the position of apron plates 116 and 118 pivotally mounted about table roller centers 120 and 122 and in a normal horizontal position prior to being pivoted upwardly to a clamping position. With the crowder and hold-down elevator 102 in an elevated position as shown in FIG. 8 and the apron plates 116 and 118 in a normal horizontal position as shown in FIG. 9, stock 124 is advanced across the cutting path.

The hold-down rails 126 forming extensions of cylinder 128 positioned on elevator 102 are then extended as indicated at 126(a) in FIG. 8. The crowder and hold-down elevator 102 is then lowered by extending the piston of cylinder 106. In this manner, the hold-down rails 126 extend laterally across the runoff table 6 over the stock 124 as can be seen in FIGS. 9 and 10.

The apron plates 116 and 118 are then pivoted upwardly about table roller centers 120 and 122 to a clamping position as shown in FIG. 11, forcing the stock 124 upwardly against the hold-down rails 126. In this manner, a bending moment is created in the stock resulting in a slight curve as shown in an exaggerated form in FIG. 11. The crowder arm 130 forming an extension of cylinder 132 is then advanced by actuating the cylinder to crowd the stock towards the side of the runoff table adjacent the withdrawn saw blade 38. Since the stock has been vertically clamped between hold-down rails 126 and the forward edges of apron plates 116 and 118, the tendency of one piece of stock to override another is avoided and the stock is properly aligned and prepared for cutting. The saw blade 38 is then pivotally displaced through the cutting cycle as shown in FIG. 10 and the apron plates returned to their normal position as shown in FIG. 9.

Where the cutting cycle has severed crop ends from a length of stock, the scrap pieces 131 may be dumped into a crop chute 133 by pivoting apron plates 116 and 118 downwardly about table roller centers 120 and 122 to a dump position as illustrated by 116(a) and 118(a) in FIG. 9. The apron plates can then be raised to the normal position and stock advanced in preparation for another cutting cycle.

It should also be noted that during the cutting operation in conventional saw assemblies, the rotating blade exerts a downward force on the stock. The cut edges of the stock are in turn pressed downwardly and inwardly and tend to narrow the kerf, thereby pinching the blade and contributing markedly to its wear.

However, as previously discussed, when the stock is raised against the hold-down rails 126 by the apron plates 116 and 118, a slight bending is produced as shown in FIG. 11. Consequently, as the blade passes through the stock, the cut edges are pulled away from the blade, thereby widening the kerf and avoiding undesirable blade pinching.

It is my intention to cover all changes and modifications of the example of the invention chosen for purposes of disclosure which do not constitute departures from the spirit and scope of the invention.

I claim:

1. In a rolling mill, apparatus for cutting longitudinal stock supported by a runoff table comprising the combination of: a base member positioned in fixed relationship to said runoff table with front and rear pivotally mounted supporting links extending upwardly therefrom, a saw frame supported by and pivotally attached to the upper extremities of said links for transverse displacement with respect to the longitudinal axis of said runoff table, a saw blade rotatably mounted on said frame and extending outwardly therefrom, a drive motor mounted on said frame and operatively connected to said blade, retractable and adjustable means for cleaning and cooling the cutting edges of said blade during the cutting operation by directing a high pressure stream of coolant thereon, means for preventing the deposit of said coolant on said stock during the cutting operation, means for alternately advancing and withdrawing said pivotally mounted frame through a cutting cycle across the longitudinal axis of said runoff table, said front and rear supporting links cooperating to maintain said saw blade in a substantially horizontal path during said cutting cycle, and means for crowding and holding said stock in fixed relationship to the path of said saw blade and for preventing narrowing of the kerf and pinching of said blade by said stock during said cutting cycle.

2. Apparatus as described in claim 1 wherein said retractable and adjustable means for cleaning and cooling the cutting edges of said blade comprises a coolant assembly plate slidably mounted on said frame with forward and rear stops extending upwardly therefrom, means for adjusting the position of said plate with respect to the periphery of said saw blade, a water block slidably mounted for movement on the upper surface of said coolant assembly plate between said forward and rear stops, said water block having a plurality of nozzles extending outwardly therefrom towards said cutting edges, and a quick release means for holding said water block against said forward stop during normal operation and for immediately withdrawing said water block when said nozzles require cleaning.

3. Apparatus as set forth in claim 2 wherein said quick release means is comprised of a toggle strut attached to said water block and said rear stop.

4. Apparatus as set forth in claim 1 wherein said means for crowding and holding said stock in fixed relationship to the path of said saw blade and for preventing narrowing of the kerf and pinching of said blade during said cutting cycle comprises: a crowder and hold-down elevator pivotally mounted adjacent said runoff table supporting said stock, means for pivotally lowering said elevator from a raised position to a lowered position, extensible spaced hold-down rails mounted on said elevator, means for extending said rails when said elevator is in a raised position in order to enable said rails to reach across said runoff table when said elevator is pivotally lowered; said runoff table having pivotally mounted apron plates, means for pivoting said apron plates from a normal horizontal position upwardly to a clamping position in order to clamp said stock against said hold-down rails and alternately to a downward crop dump position in order to deposit cropped ends; an extensible crowder arm operatively mounted on said elevator, and means for extending said crowder arm to force said stock towards said blade subsequent to the extension of said hold-down rails, the lowering of said elevator and the upward pivotal displacement of said apron plates to a clamping position in order to crowd said stock towards said blade and hold it firmly in place during the cutting cycle.

5. In a rolling mill, apparatus for cutting elongated stock at rest on a common longitudinal supporting surface comprising the combination of: a base member fixed adjacent said supporting surface with pivotally mounted supporting links extending upwardly therefrom; a saw frame overlying said base member and pivotally connected to the upper extremities of said links for movement in a direction transverse to the length of said supporting surface; a saw blade rotatably mounted on said frame; means on said frame for driving said saw blade; retractable and adjustable cooling means for cleaning and cooling the cutting edges of said blade during the cutting operation, said cooling means comprising a coolant assembly plate slidably mounted on said frame with forward and rear stops extending upwardly therefrom, means for adjusting the position of said coolant assembly plate in relation to said saw blade, a water block slidably mounted on said coolant assembly plate for reciprocal motion thereon between said stops, means on said water block for applying a high pressure stream of coolant to said cutting edges, and means for adjusting said water block from an operative position abutting said forward stop to a withdrawn inoperative position; means for alternately withdrawing and advancing said pivotally connected frame through a cutting cycle transverse to the longitudinal axis of said supporting surface, said supporting links cooperating to maintain said saw blade in a substantially horizontal path during said cutting cycle; and stock retaining means for crowding and holding said stock in fixed relationship to the path of said saw blade while preventing narrowing of the kerf and pinching of the blade during said cutting cycle, said stock retaining means comprising pivotally mounted apron plates forming a portion of said supporting surface adjacent both sides of the path of said saw blade, hold-down means adjacent said supporting surface in the area of said apron plates, means for lowering said hold-down means to a position overlying each said apron plates, means for pivoting said apron plates upwardly to clamp stock resting thereon against said lowered hold-down means, thereby creating a slight bend in the stock where a cut is to be performed, and crowder means for pushing said clamped stock to a collected position at one side of said supporting surface.

6. Apparatus for cutting elongated stock comprising the combination of: a base adapted to be fixed adjacent the stock to be cut; a frame having mounted thereon a rotatable cutter; means carried by said frame for driving said cutter; intermediate link members of unequal length supporting said frame on said base, each said link members pivotally connected at one end to said frame and at the other end to said base, said link members being operative during a cutting cycle to tilt said frame relative to said base in order to guide said cutter across the stock in a substantially straight line path parallel to said base; and, means for moving said frame through said cutting cycle.

References Cited by the Examiner
UNITED STATES PATENTS

| | | | |
|---|---|---|---|
| 1,437,309 | 11/1922 | Hughes | 83—488 |
| 2,152,762 | 4/1939 | Humphrey | 74—103 |
| 2,163,687 | 6/1939 | Jacobsen | 83—171 |
| 2,351,962 | 6/1944 | Harrison | 83—157 |
| 2,397,192 | 3/1946 | Meyerbach | 83—157 |
| 2,535,182 | 12/1950 | Weaver | 143—46.47 |
| 2,546,277 | 3/1951 | Schwandt | 74—103 X |
| 2,551,130 | 5/1951 | Hunt | 143—46.47 |
| 2,946,251 | 7/1960 | Engel | 83—488 |
| 3,024,818 | 3/1962 | Scoville | 143—46.1 |
| 3,034,387 | 5/1962 | Sebastian | 83—168 |
| 3,066,564 | 12/1963 | Carpenter | 83—175 |
| 3,069,950 | 12/1962 | Hensley | 83—168 |

FOREIGN PATENTS

| | | |
|---|---|---|
| 581,369 | 7/1933 | Germany. |
| 940,673 | 3/1956 | Germany. |

ANDREW R. JUHASZ, *Primary Examiner.*